Figure 2:
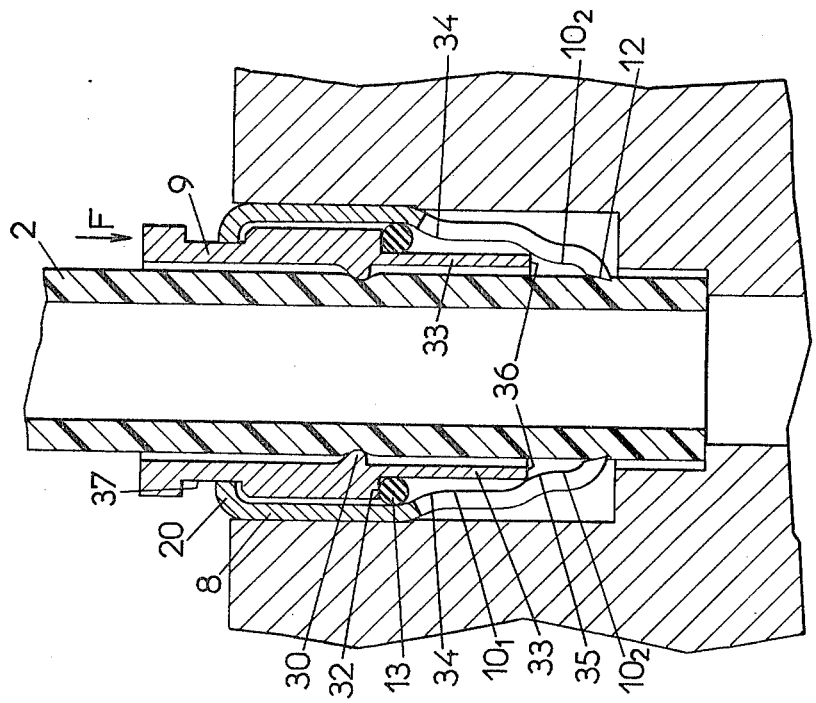

United States Patent [19]

Mariaulle

[11] 4,240,651
[45] Dec. 23, 1980

[54] COUPLING SYSTEMS FOR CONDUITS, PARTICULARLY FOR SEMI-RIGID PLASTIC TUBES

[75] Inventor: Claude Mariaulle, Le Palais sur Vienne, France

[73] Assignee: Automatisation-Sogemo, Saint-Junien, France

[21] Appl. No.: 924,803

[22] Filed: Jul. 14, 1978

[30] Foreign Application Priority Data

Jul. 20, 1977 [FR] France .................................. 77 22290

[51] Int. Cl.² ............................................ F16L 21/02
[52] U.S. Cl. ..................................... 285/39; 285/238; 285/322
[58] Field of Search ................... 285/39, 238, 323, 322

[56] References Cited

U.S. PATENT DOCUMENTS

| 2,787,480 | 4/1957 | Staller | 285/238 |
| 2,967,067 | 1/1961 | Singer | 285/238 |
| 3,976,314 | 8/1976 | Graham | 285/340 X |
| 4,021,062 | 5/1977 | Mariaulle | 285/39 |
| 4,123,090 | 10/1978 | Kotsakis et al. | 285/39 |

Primary Examiner—Thomas F. Callaghan
Attorney, Agent, or Firm—Larson, Taylor and Hinds

[57] ABSTRACT

A device for coupling semi-rigid plastic tubes of a known type in which two ring members are provided, one within the other. The outer ring member is secured in a bore in a part to which the tube is connected. The outer ring member has a plurality of teeth which engage a tube inserted into the ring members. The inner ring member is movable axially to disengage the teeth for uncoupling the tube and part. The device is improved in one aspect by providing two distinct sealing means, each movable with the inner ring member. A first sealing means comprises a projection on the inner surface of the inner ring member which projection penetrates the wall of a tube to be connected. A second sealing means comprises a sealing member, such as an O-ring, mounted on the inner ring member. In another aspect, the teeth are shaped such that they are easily disengageable, without permanent distortion, so that the device is re-usable.

4 Claims, 2 Drawing Figures

COUPLING SYSTEMS FOR CONDUITS, PARTICULARLY FOR SEMI-RIGID PLASTIC TUBES

The invention relates to improvements made to coupling systems of the kind specified in the U.S. Pat. No. 4,021,062, meant more specially for coupling semi-rigid plastic tubes (although it may be possibly applied to metal tubes). It relates in particular to systems of this kind for hydraulic or pneumatic installations, for forming connections, either between tubes, or between tubes and pneumatic or hydraulic components of said installations.

In U.S. Pat. No. 4,021,062, coupling systems are described characterized by the combination, on the one hand, of a lock ring fixed in a bore intended to receive it and provided with teeth for hooking on to the tube to be fixed and, on the other hand, of an unlocking ring mounted inside the lock ring and capable, when axially moved, of spreading out said teeth.

There was furthermore provided a sealing ring for providing the seal between the tube and the lock ring, itself sealingly fixed in its bore.

It is an object of the present invention to improve the sealing of a device of the type shown in U.S. Pat. No. 4,021,062, by simple means and, thus, facilitating the operation of the unlocking ring, without risk of permanent distortion of the teeth of the lock ring.

According to one of the embodiments of the invention, the sealing between tube and connector, is ensured by two different sealing means, one between tube and unlocking ring, the other between the latter and the lock ring.

The first sealing means involves providing the unlocking ring, towards the inside, with an annular swelling having an inner diameter a little less than the outer diameter of the tube, so that there is penetration into the material of the tube.

The second sealing means comprises for example an O-ring or similar sealing member interposed between the two rings.

According to another arrangement of the invention, the portion of the teeth adjacent their hooking on edges are given a very slightly flared shape. The portion of the teeth is separated from the tube by a gap of a value a little greater than the thickness of the active end part of the unlocking ring, so that, during unlocking, the active end part of the unlocking ring may penetrate into said gap while moving aside the hooking on edge by a distance sufficient for unlocking, without however exceeding a value likely to cause permanent distortion.

Thus, a connector after use may always be used again.

The invention comprises, apart from these arrangements, certain other arrangements which are preferably used at the same time and which will be more explicitly discussed hereafter.

The invention relates, more particularly, to certain modes of application as well as to certain embodiments, of said arrangements; and it relates, more particularly still, and this by way of new industrial products, to systems of the kind in question comprising application of these same arrangements, as well as the special elements for their construction and the units or installations comprising similar systems.

The invention will, in any case, be well understood with the help of the description which follows, as well as from the accompanying drawings, which are, of course, given by way of example.

Figure 1:
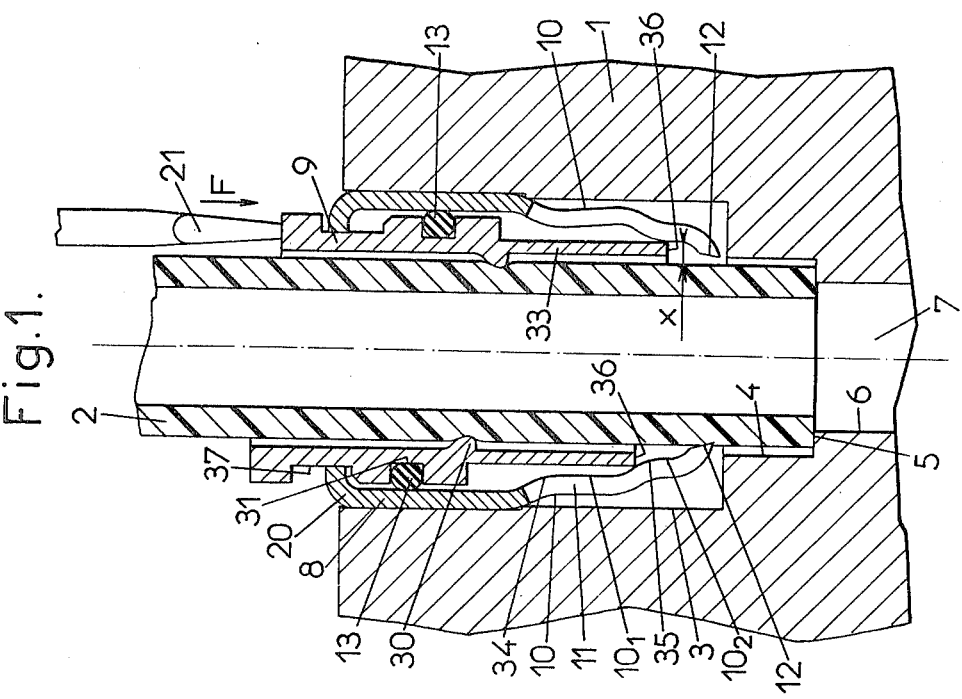

FIG. 1 of these drawings, shows in two partial axial semi-sections corresponding to two different operating conditions, the assembly of a part of a hydraulic or pneumatic component and a tube connector, particularly a semi-rigid plastic tube, this assembly being constructed according to the invention.

FIG. 2 shows similarly, in axial section, a variation of the embodiment of FIG. 1

In the description which follows, the invention is illustrated as a coupling for hydraulic or pneumatic conduits, particularly plastic tubes. A part 1 having a bore 7 is provided for coupling to a tube 2. There is formed in part 1 two bores 3 and 4. Bore 3 is adapted for receiving a lock ring 8 which will be described hereafter. Bore 4 is adapted for receiving the end of tube 2, abutting an edge 5, which tube communicates at 6 with the bore 7 of part 1.

For securing tube 2 to part 1, recourse is had essentially to two rings 8 and 9, viz.:

(a) a ring 8, for example made from bronze or brass, capable of being fixed, by crimping, bonding or other means, to the wall of bore 3, said ring comprising, at the base of its full part appearing at the inlet to bore 3, a number of teeth 10 separated by slits 11 and finishing in claws 12, arranged so as to appear along a circular line having a diameter a little less than the outer diameter of tube 2; and (b) an unlocking ring 9 adapted to be introduced inside lock ring 8 which, when pushed towards teeth 10, causes the separation and unlocking of the teeth.

In accordance with one of the arrangements of the present invention, the seal between the tube and the connector is provided by two distinct means, one between tube 2 and unlocking ring 9, the other between ring 9 and outer lock ring 8.

In so far as the sealing means to be provided between tube 2 and ring 9 are concerned, it is advantageously formed (FIGS. 1 and 2) by at least one annular projection 30 provided on the inner surface of the ring, the inner dimensions of this projection being slightly less than those of the external wall of tube 2 so that, during fitting, said projection penetrates slightly into the material of the tube, thus providing the seal. The outer shapes of the projection has a rounded contour so as not to harm the surface of the tube.

In so far as the second sealing means are concerned, to be provided between ring 9 and lock ring 8, it is formed for example by at least one O-ring 13. This ring may for example be partially engaged in an outer groove 31 of ring 9 (FIG. 1) or else, according to one of the numerous possible variations, it may be housed under a flange 32 (FIG. 2) connecting the central part of ring 9 to a thinner part such as sleeve 33 intended to cooperate with the teeth 10 of lock ring 8.

Another arrangement of the invention, relating more especially to the shape of teeth 10 and their cooperation with ring 9, 33, is also illustrated in FIGS. 1 and 2.

According to this arrangement, teeth 10 comprise a doubly wavy profile, i.e.:

(a) one part $10_1$ whose inner surface comes close, without touching, to the outer surface of sleeve 33, while being connected to the body of ring 8 through a bend 34; and (b) one part $10_2$, cylindrical or slightly flared, finishing in claw 12, this part having its inner wall of a diameter slightly less than the diameter of the external surface of sleeve 33, and being connected to part 10₁ through a bend 35.

The assembly operates in the following way.

In the fitting and unlocking position (left side of FIG. 1) the two rings 8 and 9 are one inside the other, and the outer edge 36 of sleeve 33 does not penetrate into the gap remaining free, for each tooth 10, between tube 2 (assumed introduced into part 1) and part 10₂, of said tooth. Thus, claw 12 is free penetrate and embed itself in the material of said tube.

For unlocking, unlocking ring 9 is acted on, for example by means of a tool 21 (right side of FIG. 1) in order to move it in the direction of arrow F. Edge 36 of the sleeve then, by sliding over the bend 35 of each tooth, spreads out these latter while penetrating into gap x (FIG. 1) between part 10₂ and tube 2. Thus, each of claws 12 (as shown at the right of FIG. 1) is lifted up in a very precise way, thus releasing tube 2, but without the risk of an exaggerated lifting up causing permanent distortion of the teeth.

The coupling device is thus ready for re-use.

It is to be noted that, just as in U.S. Pat. No. 4,021,062 is delivered for use in the form of a ready-to-use cartridge, in which rings 8 and 9 are previously introduced and maintained one in the other, with their seal 13. All that is required, to hold the rings in place, is to crimp for example at 20, the outer edge of lock ring 8 towards a groove 37 of unlocking ring 9. Ring 9 will generally be made from a plastic material, but it could also be made from metal.

It is also to be noted that, in the variation of FIG. 2, seal 13 is maintained in place by the presence of bends 34 of teeth 10 and that the elasticity of said seal thus tends to bring ring 9 backwards, in the opposite direction to arrow F, and so to bring it to its normal locking position which it must occupy during fitting.

It will be clear from the foregoing that the present invention provides many advantages among which are:
a particularly simple construction,
always providing a good seal,
and, owing to the particular shpae of the teeth and the sleeve cooperating therewith, allowing unlocking to be achieved with precision and without harming the qualities of the assembly which may then be used again.

As is evident, and as it follows moreover already from what has gone before, the invention is in no wise limited to those of its modes of application and embodiments which have been more specially considered; it embraces, on the contrary, all variations thereof.

What is claimed is:

1. In a coupling system for coupling semi-rigid plastic tubes in which two ring members are provided one within the other, the outer ring member being adapted to be secured in sealing engagement in a bore within a part to which the tube is to be connected, said outer ring member having a plurality of teeth extending lengthwise of a tube inserted into said outer ring member, said teeth terminating in claws engageable with the outer wall of a tube inserted into said outer ring member, the inner ring member being movable axially within the outer ring member and having an end portion engageable with said teeth to effect disengagement of said teeth from a tube by axial movement of said inner ring member within said outer ring member in combination with first and second distinct sealing means for sealing the inner ring member and, respectively, a semi-rigid plastic tube and the outer ring member the improvement comprising an integral annular projection having a rounded contour provided on the inner surface of said inner ring member used as the first sealing means, the inner diameter of said projection being slightly smaller than the outer diameter of a tube inserted therein whereby the projection penetrates into the wall of an inserted semi-rigid plastic tube without embedding in the wall, said second sealing means comprising a toroidal sealing member positioned between the inner and outer ring members, and mounted for axial movement with said inner ring member, said first and second sealing means moving axially with said inner ring member.

2. An improved coupling system as claimed in claim 1 wherein said inner ring member comprises a peripheral channel in which said toroidal sealing member is mounted, and wherein said projection is provided on said inner ring member at a location between said peripheral channel and said teeth of said outer ring member.

3. An improved coupling system as claimed in claim 1 wherein said inner ring comprises a first sleeve portion and a second sleeve portion, said second sleeve portion being thinner than said first sleeve portion and having an end portion engageable with said teeth to effect disengagement of said teeth from a tube by axial movement of said inner ring member within said outer ring member, wherein said projection is located on the first, thicker, sleeve portion of said inner ring member and wherein said toroidal sealing member is mounted at the joint formed between said first and second sleeve portions of said inner ring member.

4. An improved coupling system as claimed in claim 1 wherein each of said teeth has a doubly wavy profile which comprises a first portion extending axially of said end portion of said inner ring member, a second portion extending further axially of said end portion of said inner ring member, said second portion being flared slightly inwardly in a direction extending towards said claws and forming a gap between said second portion and a tube inserted into said outer ring member and engaged by said claws, said gap being slightly narrower than the distance between the inner surface of said end portion of said inner ring member and the outer surface of an inserted tube, said first and second portions of said teeth being joined together by a bend whereby the teeth are readily and easily disengaged from an inserted tube in the manner described without risk of permanent distortion of the teeth.

* * * * *